US009090299B1

(12) United States Patent
Weiss (10) Patent No.: US 9,090,299 B1
(45) Date of Patent: Jul. 28, 2015

(54) DEVICE FOR MOUNTING TRANSPONDER TO MOTORCYCLE

(71) Applicant: Geraldine Weiss, Destin, FL (US)

(72) Inventor: Geraldine Weiss, Destin, FL (US)

( * ) Notice: Subject to any disclaimer, the term of this patent is extended or adjusted under 35 U.S.C. 154(b) by 116 days.

(21) Appl. No.: 13/632,946

(22) Filed: Oct. 1, 2012

Related U.S. Application Data

(60) Provisional application No. 61/626,802, filed on Oct. 4, 2011.

(51) Int. Cl.

| *B62J 11/00* | (2006.01) |
|---|---|
| *B62J 9/00* | (2006.01) |
| *B62J 99/00* | (2009.01) |
| *B62J 7/02* | (2006.01) |

(52) U.S. Cl.
CPC ... *B62J 11/00* (2013.01); *B62J 7/02* (2013.01); *B62J 9/005* (2013.01); *B62J 2099/004* (2013.01); *B62J 2099/0033* (2013.01); *B62J 2300/0033* (2013.01)

(58) Field of Classification Search
CPC .............. B62J 11/00; B62J 9/005; B62J 7/02; B62J 2300/0033; B62J 2099/0033
USPC ........................................................ 224/424
See application file for complete search history.

(56) References Cited

U.S. PATENT DOCUMENTS

| 3,322,313 | A | * | 5/1967 | Giondi | 224/434 |
|---|---|---|---|---|---|
| 4,059,207 | A | * | 11/1977 | Jackson et al. | 224/413 |
| 4,068,859 | A | * | 1/1978 | Dittman | 280/304.4 |
| 4,359,233 | A | * | 11/1982 | Jackson et al. | 224/413 |
| 4,445,228 | A | * | 4/1984 | Bruni | 381/302 |
| 4,469,256 | A | * | 9/1984 | McEwen | 224/413 |
| 4,515,300 | A | * | 5/1985 | Cohen | 224/153 |
| 4,629,040 | A | * | 12/1986 | Jones | 190/102 |
| 4,756,454 | A | * | 7/1988 | Villanueva et al. | 224/418 |
| 5,001,779 | A | * | 3/1991 | Eggert et al. | 455/346 |
| 5,020,524 | A | * | 6/1991 | Donohue | 602/22 |
| 5,175,873 | A | * | 12/1992 | Goldenberg et al. | 455/351 |
| 5,405,068 | A | * | 4/1995 | Lovett | 224/153 |
| 5,409,152 | A | * | 4/1995 | Trevino | 224/576 |
| 5,746,442 | A | * | 5/1998 | Hoyaukin | 280/730.1 |
| 5,807,217 | A | * | 9/1998 | Endelman | 482/122 |
| 5,925,064 | A | * | 7/1999 | Meyers et al. | 606/205 |
| 6,305,590 | B1 | * | 10/2001 | Hayes | 224/413 |
| 6,663,128 | B2 | * | 12/2003 | Dichter | 280/288.4 |
| 6,883,693 | B2 | * | 4/2005 | Han | 224/576 |
| 8,820,596 | B1 | * | 9/2014 | Bergquist | 224/153 |
| 2002/0030052 | A1 | * | 3/2002 | Joo-Tai | 220/9.2 |
| 2002/0084278 | A1 | * | 7/2002 | Woods, II | 220/739 |
| 2002/0113185 | A1 | * | 8/2002 | Ziegler | 248/309.1 |
| 2004/0040993 | A1 | * | 3/2004 | Spratley | 224/413 |
| 2004/0191450 | A1 | * | 9/2004 | McGuinness et al. | 428/36.9 |
| 2005/0045681 | A1 | * | 3/2005 | Hancock et al. | 224/401 |
| 2011/0233249 | A1 | * | 9/2011 | Nakajima | 224/545 |

* cited by examiner

*Primary Examiner* — Brian D Nash
(74) *Attorney, Agent, or Firm* — Nancy J. Flint, Esq.; Nancy J. Flint, Attorney At Law, P.A.

(57) ABSTRACT

A device that houses and mounts transponders on a motorcycle, allowing the motorcycle to pass through an ETC system without the need to stop and pay the toll, thus reducing the dangers and traffic slowdowns often associated with motorcycles and ETC systems, is disclosed. The device is configured to house an ETC system transponder that can be detachably mounted on a motorcycle. The device does not require permanent mountings to be placed on the motorcycle. A component of the device can serve as a wallet or a drink holder when not mounted on the motorcycle.

8 Claims, 7 Drawing Sheets

Fig. 5

DEVICE FOR MOUNTING TRANSPONDER TO MOTORCYCLE

RELATED APPLICATION

This application claims priority to U.S. Provisional Patent Application Ser. No. 61/626,802, filed on Oct. 4, 2011 and titled Soft-Sided, Water-Resistant, Self-Coiling Device For Mounting Transponder to Motorcycle, the contents of which are incorporated in their entirety.

FIELD OF THE INVENTION

The invention relates to a device that houses and mounts transponders on a motorcycle, allowing the motorcycle to pass through an ETC system without the need to stop and pay the toll, thus reducing the dangers and traffic slowdowns often associated with motorcycles and ETC systems. The device of the invention is configured to house an ETC system transponder that can be detachably mounted on a motorcycle. The device of the invention does not require permanent mountings to be placed on the motorcycle. The device of the invention can serve as a wallet or a drink holder when not mounted on the motorcycle.

BACKGROUND OF THE INVENTION

Toll roads are present throughout the United States, requiring travelers to pay a fee to travel on the highway. The vast majority of such toll roads employ Electronic Toll Collection ("ETC") technology that allows travelers to pass through automatic gates without coming to a complete stop to pay the required fee. The automatic gates operate by communicating with a transponder by way of a reader, where the transponder is typically mounted on a vehicle's windshield. Each transponder is connected to an owner's prepaid account. The account is debited the toll amount with each passage through an automatic tollgate. Most current ETC systems rely on radio-frequency identification, where an antenna at the toll gate communicates with the transponder on the vehicle via Dedicated Short Range Communications (DSRC). RFID tags have proved to have excellent accuracy for this purpose, and can be read at highway speeds.

ETC systems facilitate the flow of traffic by eliminating the need for vehicles to stop and pay the toll directly to a toll collector or a machine.

Vehicles displaying an active transponder that is enrolled with the ETC system can pass through an automatic tollgate without coming to a complete stop. The toll is automatically charged to the account holder so that no payment need be made onsite to a human toll collector or a machine. As a result traffic is able to flow continuously without unnecessary delay.

The introduction of ETC technology has successfully managed the flow of traffic for cars and trucks alike. However, the transponder has been proven to be ineffective for use on motorcycles. Motorcycles are rarely equipped with the glass windshield necessary to mount the transponder and allow communication to the ETC readers. If the transponder were to be mounted to the motorcycle, the owner would be unable to leave the motorcycle unattended without risk of theft of the transponder. In addition, mounting a device such as a transponder with affixed braces or permanent adhesives causes irreversible damage to motorcycle paint and chrome finishes. As a result, motorcycle operators tend to not use transponders in ETC system and therefore are required to stop at traditional tollgates whereupon they must retrieve the toll amount due from their pocket or other compartment. The problem and delay in traffic flow is heightened when two or more motorcycles travel together. This situation requires the motorcycles to pass one at a time, causing the first riders in line to pullover to the side of the road and wait for their party. Driving a motorcycle on and off the shoulder on a fast-paced highway presents dangers and foreseeable risks to the safety of all travelers.

SUMMARY OF THE INVENTION

The invention relates to a device that houses and mounts transponders on a motorcycle, allowing the motorcycle to pass through an ETC system without the need to stop and pay the toll, thus reducing the dangers and traffic slowdowns often associated with motorcycles and ETC systems. The device of the invention is configured to house an ETC system transponder that can be detachably mounted on a motorcycle. The device of the invention does not require permanent mountings to be placed on the motorcycle. The device of the invention can serve as a wallet or a drink holder when not mounted on the motorcycle.

The invention comprises two components—a casing and a fastener.

The casing is a water resistant housing for a transponder that can be releasably sealed for insertion and removal of the transponder. The casing comprises a front side and a back side, where the back side comprises a securement mechanism for attaching the casing to the second component. The securement mechanism may comprise, for example, one element of a hook and loop fastener system such as a Velcro® strip and/or affixed snaps and/or rivets and/or an elastic strap. A key ring may optionally be attached to the casing.

The fastener is configured to detachably attach the device to a motorcycle without the need for permanent mountings on the motorcycle. In one embodiment, the fastener has a rectangular shape and comprises two self-coiling spring strips. The self-coiling strips can be encased in malleable padding that is then covered in a water resistant housing, where the face of the water resistant housing mates with the securement mechanism of the casing. For example, the water resistant housing may comprise the corresponding loops for the hooks on the casing, or may comprise snaps and/or rivets that attach to the securement mechanism on the casing.

The two components of the device—the casing and the fastener—are thus securable together. The device thus can be firmly coiled around a motorcycle fork or other motorcycle component by way of the fastener and remain securely in place during travel. The design of the invention does not require any attachment mechanism to be placed on the motorcycle, such as adhesives, braces, brackets, or other fixtures. The device can be made available in a variety of colors, pattern exterior designs, fabrics and materials.

DESCRIPTION OF THE DRAWINGS

The invention will be described with reference to the accompanying drawings.

DETAILED DESCRIPTION OF THE INVENTION

The invention relates to a device that houses and mounts transponders on a motorcycle, allowing the motorcycle to pass through an ETC system without the need to stop and pay the toll, thus reducing the dangers and traffic slowdowns often associated with motorcycles and ETC systems. The device of the invention is configured to house an ETC system transponder that can be detachably mounted on a motorcycle. The device of the invention does not require permanent mountings to be placed on the motorcycle. The device of the invention can serve as a wallet or a drink holder when not mounted on the motorcycle.

The invention comprises two components—a casing and a fastener. The casing is a water resistant housing for a transponder that can be releasably sealed for insertion and removal of the transponder. The casing comprises a front side and a back side, where the back side comprises a securement mechanism for removably attaching the casing to the fastener.

The casing may comprise, for example, neoprene or any other synthetic or natural weather resistant material through which RFID transponder signals can pass through to an ETC detector. In one embodiment, the neoprene is about 1.5 to 2 mm thick. The front side of the casing and the back side of the casing may be sewn together using nylon or polyester stitching to form the casing. The back side of the casing comprises an opening that is configured for the insertion, housing and removal of a transponder. The opening is sealable. In one embodiment, the casing comprises a flap sewn into a seam along one end of the casing which can be folded over the opening in the back side of the casing, and which may be made of the same material as the casing. The opening may further be sealed using any faster now known or later developed, such as hook and loop fasteners, snaps, rivets or hook and eye fasteners.

A securement mechanism for attaching the casing to the fastener is disposed on the back side of the casing. The securement mechanism may comprise, for example, one element of a hook and loop fastener such as the hook portion or the loop portion of a Velcro® strip. The securement mechanism may comprise any other fastener now known or later developed, such as snaps, rivets or hook and eye fasteners. In one embodiment, the securement mechanism comprises an elastic band sewn into the seams of the casing such that the elastic band stretches from one edge of the back side of the casing to the other edge of the back side of the casing. The elastic band is configured to allow the insertion of the fastener between the elastic band and the back side of the casing with sufficient tension to secure the casing to the fastener during travel in the motorcycle. In one embodiment, the elastic band comprises a heavy duty 1½ inch waist band elastic.

An attachment mechanism to attach the casing to a user may optionally be attached to the casing. For example, an elastic loop may be sewn into a seam of the casing to which a split key ring or carabiner can be affixed.

The second component comprises a fastener configured to detachably attach the device to a motorcycle without the need for permanent mountings on the motorcycle. The fastener in one embodiment may further comprise a securement mechanism that mates with the securement mechanism of the casing to removably attach the casing to the fastener.

In one embodiment, the fastener has a rectangular shape and comprises two self-coiling spring strips. The self-coiling strips can be encased in malleable padding that is then covered in a water resistant housing. In one embodiment, one side of the fastener comprises a securement mechanism disposed on the water resistant housing which mates with the securement mechanism of the casing. For example, the water resistant housing may comprise the corresponding hook portion or the loop portion of a Velcro® strip that mate with the portion that is disposed on the back side of the casing, or may comprise snaps and/or rivets that attach to the securement mechanism on the casing.

In one embodiment, the self-coiling strips comprise layered, flexible stainless steel spring bands or other reversibly deformable bands sealed within a fabric or plastic cover. When the bands are straightened out, tension is created within them. The straightened bands can then be placed against a component part of the motorcycle, such as the fork or a handlebar and pressure applied to the fastener, causing the bands to wrap around that component part of the motorcycle and securing the device to the motorcycle during travel.

The two components of the device are releasably securable together. The device thus can be firmly coiled around a motorcycle fork or handlebar riser or other motorcycle component by way of the fastener and remain securely in place during travel. The design of the invention does not require any attachment mechanism to be placed on the motorcycle, such as adhesives, braces, brackets, or other fixtures. The device can be made available in a variety of colors, pattern exterior designs, fabrics and materials. For example, the device may be branded with logos of sports teams or products or decorative designs.

In one embodiment, the two components of the device may be semi-permanently attached together. For example, the two components may be sewn or glued together.

In one embodiment, the fastener can be detached from the casing after removal from the motorcycle and used to wrap around a drink container to insulate the drink container. The casing with the transponder inserted within may be attached to the user's apparel, such as a belt loop, through the attachment mechanism, for example the split key ring or carabiner. The transponder thus remains secure from being stolen from the motorcycle. Further, the user does not have to attach anything to the motorcycle in order to attach the device.

The device may be made in different sizes to accommodate various transponder sizes. In one embodiment, the casing varies in size according to the size of the transponder and the fastener can be used with various sizes of casings.

Figures 1A, 1B, 1C, 1D, 1E, 1F:
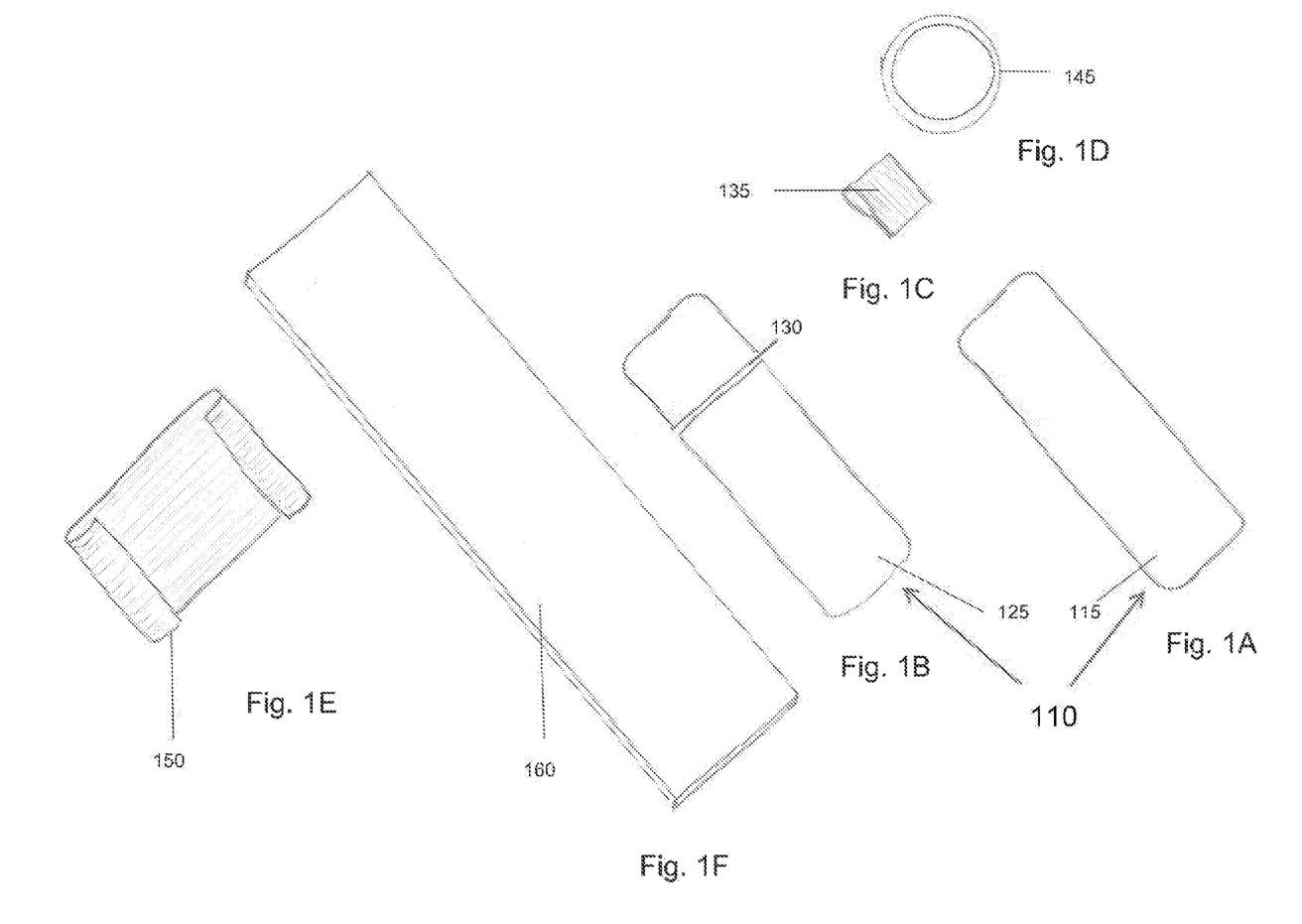
FIGS. 1A-1F depict the components of the casing and the fastener of the device according to one embodiment of the invention.

Turning to the figures, FIGS. 1A-1F depict the components of the casing and the fastener of the device according to one embodiment of the invention. FIG. 1A depicts front side 115 of casing 110. FIG. 1B depicts back side 125 of casing 110. FIG. 1B further depicts opening 130 on back side of casing 125. FIG. 1C depicts elastic loop 135 that can be sewn into the seams attaching the front side of the casing 115 to the back side of the casing 125. FIG. 1D depicts a split key ring 145 that can be attached to elastic loop 135 to attach the casing 110 to a user. FIG. 1E depicts a securement mechanism 150 comprising an elastic band that can be sewn into the seams attaching the front side of the casing 115 to the back side of the casing 125. FIG. 1F depicts fastener 160.

Figure 2A:
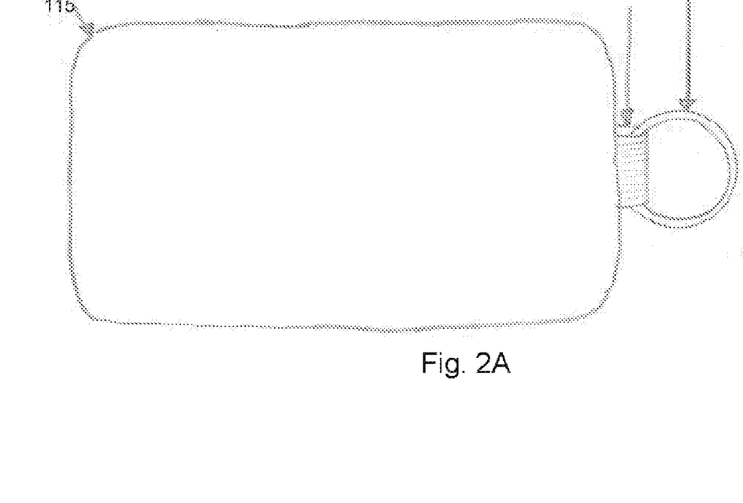
FIGS. 2A-2D depict a front view, back view, bottom view and side view of the casing of the device according to one embodiment of the invention.
Figure 2B:
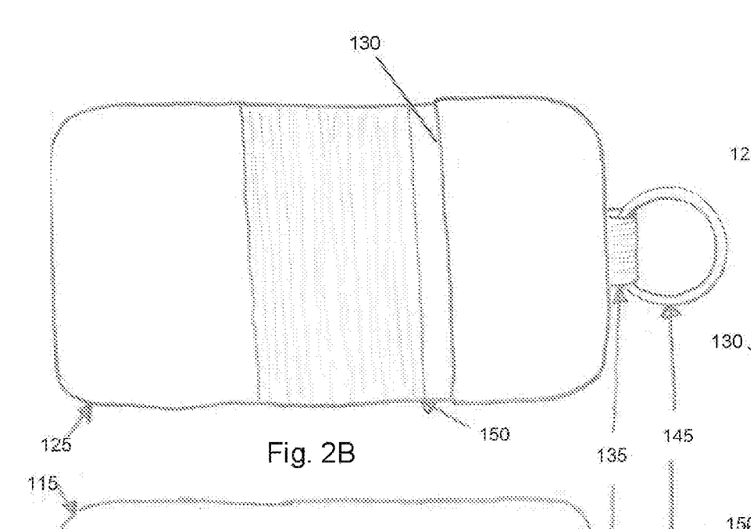
Figures 2C, 2D:
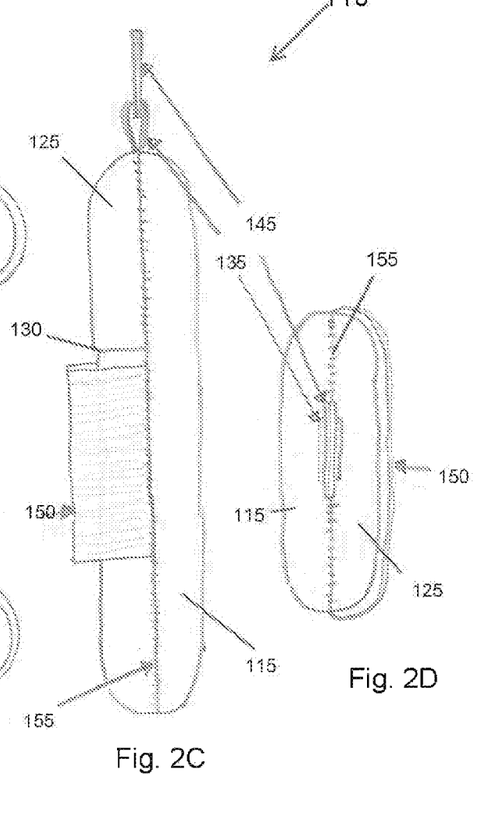

FIGS. 2A-2D depict a front view, back view, left side view and top view of the casing 110 of the device according to one embodiment of the invention. FIG. 2A depicts a front view of front side 115 of casing 110 comprising elastic loop 135 and split key ring 145. FIG. 2B depicts a back view of back side 125 of casing 110 comprising elastic loop 135, split key ring 145, securement mechanism 150 and opening 130. FIG. 2C depicts a bottom view of casing 110 as mounted on a motorcycle comprising front side 115, back side 125, elastic loop 135, split key ring 145 and seam 155. FIG. 2D depicts a side view of casing 110 as mounted on a motorcycle comprising front side 115, back side 125, elastic loop 135, split key ring 145 and seam 155.

Figure 3:
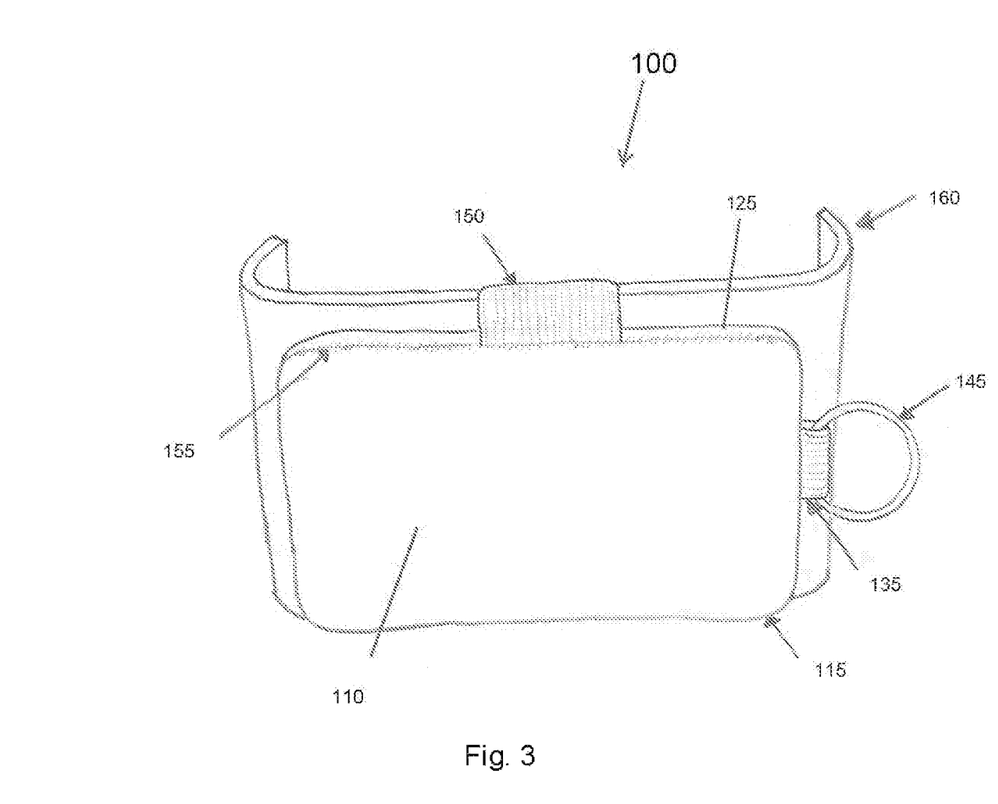
FIG. 3 depicts a front perspective view of the device according to the embodiment of the invention of FIGS. 2A-2D.

FIG. 3 depicts a front perspective view of the device 100 according to the embodiment of the invention of FIGS. 2A-2D comprising casing 110 and fastener 160. Shown is front side 115 of casing 110, seam 155, back side of casing 125, elastic loop 135, split key ring 145, securement mechanism 150 and fastener 160.

Figure 4A:
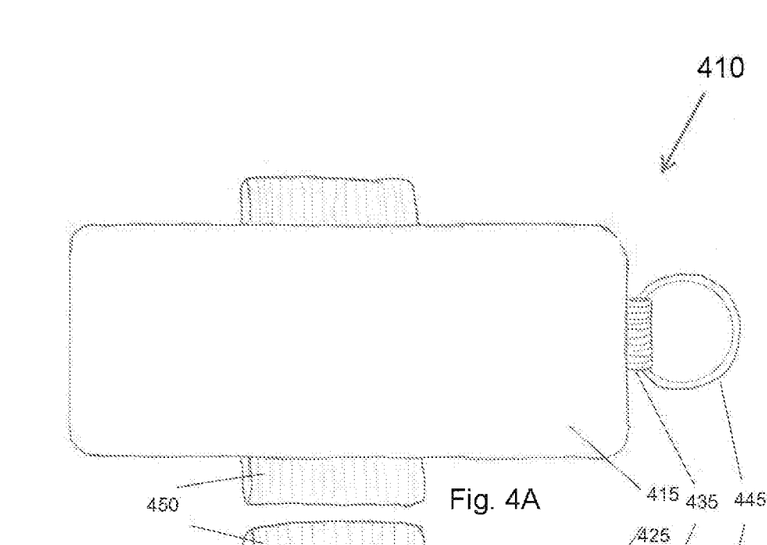
FIGS. 4A-4D depict a front view, back view, side view and bottom view of the casing of the device according to one embodiment of the invention.
Figure 4B:
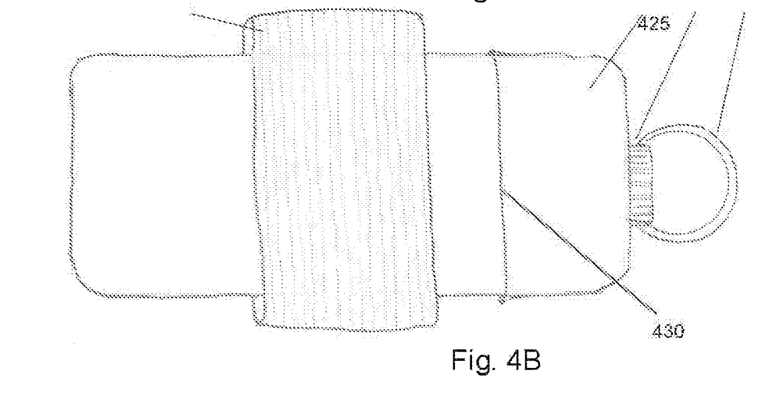
Figures 4C, 4D:
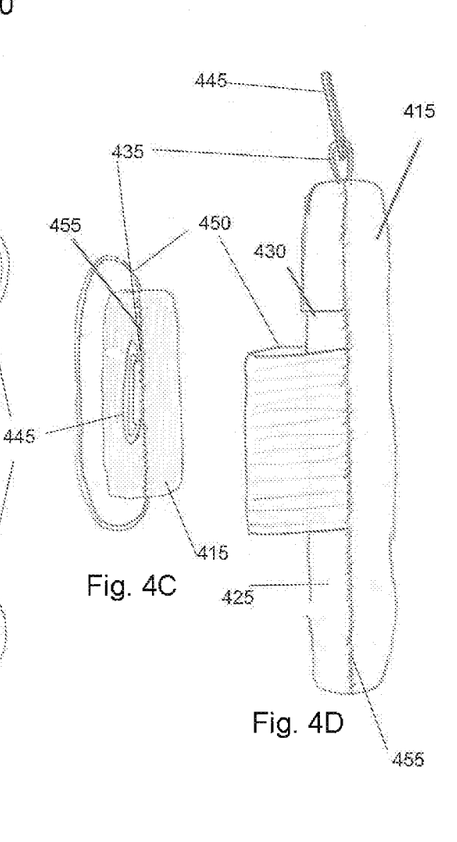

FIGS. 4A-4D depict a front view, back view, left side view and top view of the casing 410 of a device according to one embodiment of the invention. In this embodiment, the casing 410 is sized for a smaller transponder than the casing 110 of FIGS. 1-3. FIG. 4A depicts a front view of front side 415 of casing 410 comprising elastic loop 435 and split key ring 445. FIG. 4B depicts a back view of back side 425 of casing 410 comprising elastic loop 435, split key ring 445, securement mechanism 450 and opening 430. FIG. 4C depicts a side view of casing 410 as mounted on a motorcycle comprising front side 415, back side 425, elastic loop 435, split key ring 445 and seam 455. FIG. 4D depicts a bottom view of casing 410 as mounted on a motorcycle comprising front side 415, back side 425, elastic loop 435, split key ring 445 and seam 455.

Figure 5:
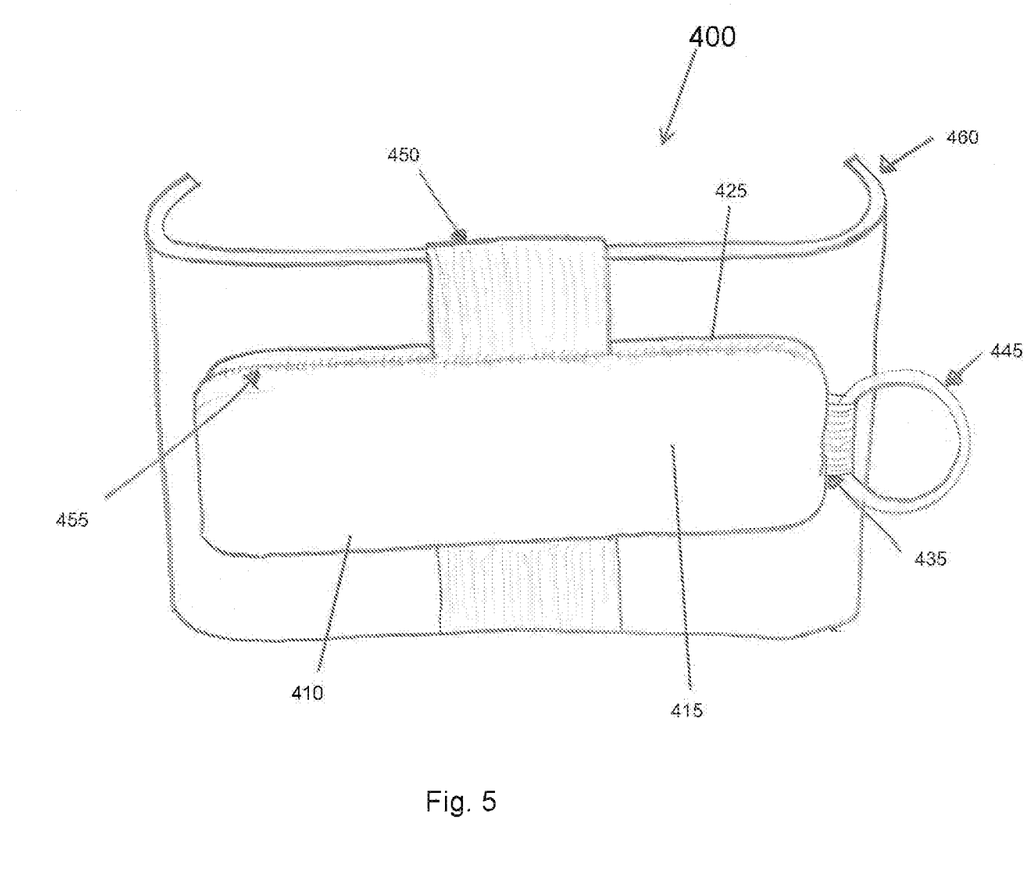
FIG. 5 depicts a front perspective view of the device according to the embodiment of the invention of FIGS. 4A-4D.

FIG. 5 depicts a front perspective view of a device 400 according to the embodiment of the invention of FIGS. 4A-4D comprising casing 410 and fastener 460. Shown is front side 415 of casing 410, seam 455, back side of casing 425, elastic loop 435, split key ring 445, securement mechanism 450 and fastener 460.

Figure 6:
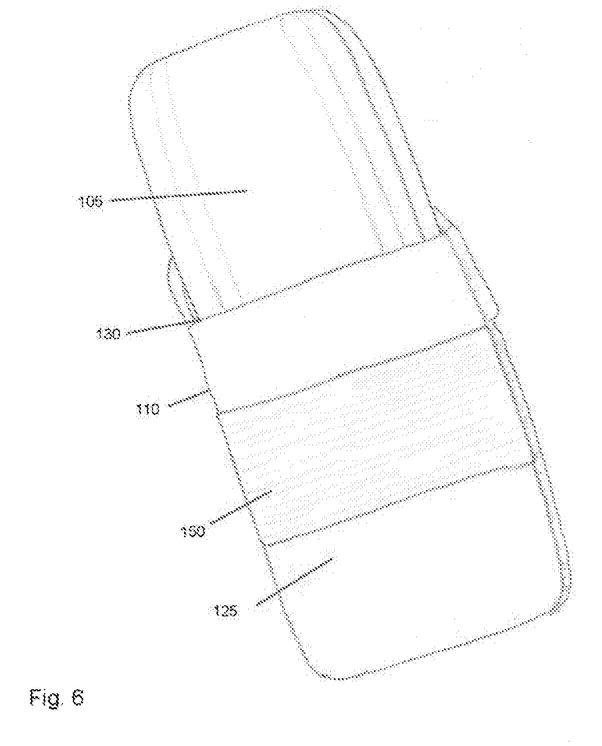
FIG. 6 depicts a transponder in the process of being inserted into the casing according to one embodiment of the invention.

FIG. 6 depicts a transponder 105 in the process of being inserted into the casing 110 according to one embodiment of the invention. Transponder 105 is inserted into casing 110 through opening 130. Also shown is securement mechanism 150 disposed on back side of casing 125.

Figure 7:
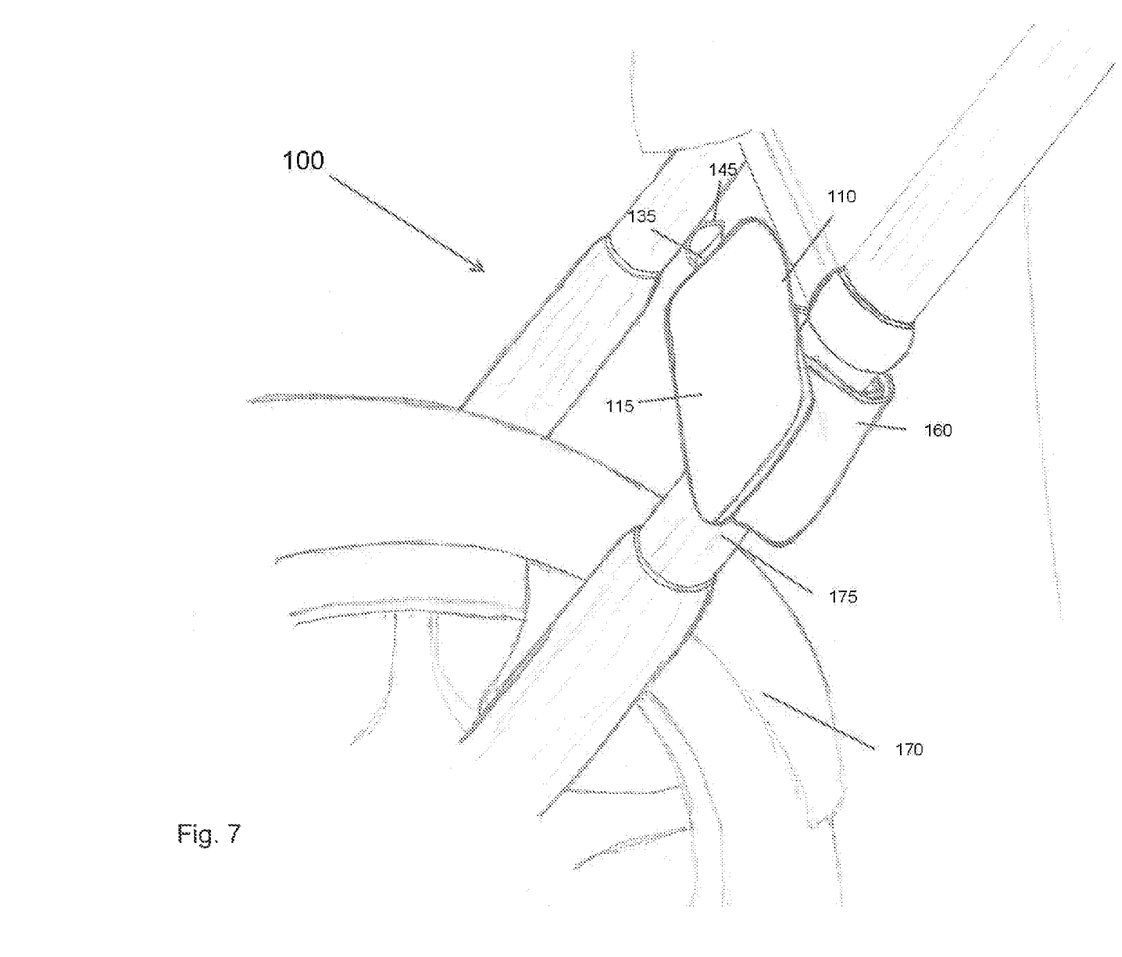
FIG. 7 depicts the device as attached to a motorcycle according to one embodiment of the invention.

FIG. 7 depicts the device as releasably attached to a motorcycle according to one embodiment of the invention. Device 100 releasably attaches to fork 175 of motorcycle 170 by way of fastener 160, whereby fastener 160 is releasably wrapped around fork 175. Front side of casing 115 can be seen along with split key ring 145 and elastic loop 135. Transponder (not seen) is inserted into the interior cavity of casing 110 where it can be detected by the reader of an ETC system at a toll booth, allowing motorcycle 170 to pass through without having to stop and manually pay the toll.

The foregoing embodiments have been presented for the purpose of illustration and description only and are not to be construed as limiting the scope of the invention in any way. The scope of the invention is to be determined from the claims appended hereto.

What is claimed is:

1. A detachable mounting device configured to mount a transponder to a motorcycle, comprising:
    a casing comprising a cavity formed by attaching a first piece and a second piece along a plurality of seams, wherein the casing comprises a front side and a back side, wherein the back side of the casing comprises an opening that is configured to permit access to the cavity, wherein the casing comprises a material that permits the transmission of radio frequency signals through the casing; and
    a fastener comprising one or more self-coiling strips, wherein each self-coiling strip comprises a layered, flexible stainless steel spring band sealed within a cover, wherein the steel band is placed under tension when in a straightened position,
    wherein the casing further comprises a first securement mechanism configured to attach the casing to the fastener,
    wherein the casing and the cover of the fastener comprise a water resistant material,
    wherein the casing is releasably attached to the fastener,
    wherein the first securement mechanism comprises an elastic band.

2. The mounting device of claim 1, wherein the water resistant material comprises neoprene.

3. The mounting device of claim 1, wherein the elastic band comprises a heavy duty 1½ inch elastic band.

4. The mounting device of claim 3, wherein the elastic band is attached to the casing by being sewn into seams on opposing edges of the casing, wherein the fastener is disposed between the elastic band and the casing, wherein the fastener is attached to the casing by the tension in the elastic band.

5. The mounting device of claim 1, wherein the fastener comprises a second securement mechanism that is configured to attach to the first securement mechanism of the casing.

6. The mounting device of claim 5, wherein the first securement mechanism comprises the hook portion of a hook and loop fastener and the second securement mechanism comprises the loop portion of a hook and loop fastener.

7. The mounting device of claim 1, further comprising an elastic loop attached to the casing and an attachment mechanism attached to the elastic loop that is configured to attach the casing to a belt loop.

8. The mounting device of claim 7, wherein the attachment mechanism comprises a split key ring or a carabiner.

* * * * *